Oct. 17, 1961

G. CAGEN 3,005,061

TELEPHONE HANDSET HANGER

Filed Feb. 29, 1960

INVENTOR.
GEORGE CAGEN
BY Lester W. Clark
ATTORNEY 3,005,061
Patented Oct. 17, 1961

3,005,061

TELEPHONE HANDSET HANGER

George Cagen, Brooklyn, N.Y., assignor to Roanwell Corporation, New York, N.Y., a corporation of New York Filed Feb. 29, 1960, Ser. No. 11,563
6 Claims. (Cl. 179—146)

This invention relates to means for supporting a telephone handset when not in use. The invention more especially relates to means for supporting a telephone handset so as to secure the instrument against displacement from the support. The invention particularly relates to a bracket or holder for supporting a telephone handset having a housing enclosing an instrument and a handle extending from the housing so that the handle is disposed generally vertically, the handset as a whole being in suspended relation to the bracket engaged by the housing.

Various means have been proposed heretofore for securely supporting in a desired location and in a predetermined relation to the support when not in use a telephone handset having an elongated handle rigidly connected at least at one end thereof to a housing enclosing a telephone instrument, e.g., a receiver or transmitter. Such a handset usually is provided with both a receiver and a transmitter respectively disposed in housings disposed at the opposite ends of the handle and rigidly connected thereto. Ordinarily, in such a handset the housings are of generally bulbous shape providing an exterior surface of convex contour disposed rearwardly with respect to an operating face of the housing. Both in the transmitter and in the receiver this operating face is formed on a portion or cover of annular or disc form perforated for passage of sound waves therethrough to the transmitter and from the receiver. Such handsets ordinarily are designed and dimensioned so that when the handset is held by the hand with the receiver placed against the ear, the transmitter is disposed adjacent the mouth of the user of the instrument. In order to secure better sound transmission to and through the operating faces of the two housings, conventionally these faces are disposed in angular relation to each other and ordinarily incline toward the handle proceeding in the direction from each housing along the handle toward the other housing.

For many uses, particularly in vehicles of various kinds which are subject to vibration, sudden or irregular forces or to lurching and jerky motion, as in certain land vehicles, or where substantial changes in the direction of movement or tilting or listing occur, as in aircraft, ships and similar vehicles, it is necessary to provide means for securely holding the instrument against casual displacement from its holder and this requires that some gripping action shall be provided which will prevent such displacement of the handset from a holder subjected to the forces and movements above mentioned, while also providing for easy removal from and return of the handset to the support by the user.

Heretofore, for example as shown in the patent to Sears 2,443,229 of June 15, 1948, a bracket or hanger has been used for supporting a telephone handset of the type to which the invention relates, the housing at one end of the handle engaging the bracket and the handle, together with the other housing if provided, hanging below the bracket. In the device of the patent and in other prior art devices, the supporting means also includes a spring means disposed at the lower side of the bracket. The spring means engages the bulbous housing of the handset so as to press the operating face of the housing against a seat provided on the bracket. The weight of the instrument is carried by the member which supports the spring means and by the spring means itself. In some cases an auxiliary means such as a projection carried by the bracket at the upper end of the seat may cooperate with the spring means to hold the bulbous housing against the seat of the bracket.

While a telephone handset of this type may be supported securely by such a bracket, certain difficulties are experienced in the use of the prior art devices. In the operation of removing the handset from such a bracket, it is necessary initially to move the handset upwardly a substantial distance in order that the housing shall be moved out of engagement with the support disposed at the lower portion of the bracket, whether this support alone is adequate to fully support the handset or whether spring arms also are provided, as in the Patent 2,443,229, for pressing the housing against the seat of the bracket and for supporting the handset. This upward movement must be effected to a point beyond that of engagement of the housing with the support or beyond engagement with the outer end of the arms of the spring means, so that the housing then may be lifted without resistance and moved by the user to its position with respect to the head and face for listening and speaking. In the operation of returning the handset to its position on the support of the bracket or between the spring arms and the seat of the bracket, it first must be lifted to a position in which the housing is substantially above the support or above the outer ends of the arms of the spring means. From this lifted position it then may be brought down into engagement with the support or with the spring arms and into position with the operating face of the housing bearing against the seat of the bracket.

In these various movements of the handset to and from the supporting bracket, a substantial initial upward movement of the handle gripped by the hand of the user is required. It has been found, in the effort to accomplish sufficient upward movement for support or for release, that the fingers or other part of the hand which holds the instrument may be brought sharply against the support on the bracket or against the spring means, with resultant abrasion or injury to the fingers or the hand. Such engagement of the hand with the bracket may be simply annoying or in some cases may interfere with or prevent some proper action by the user of the telephone instrument because of interfering with quick removal from or secure replacement of the handset on its support. The double movement mentioned is awkward and requires more time and effort to avoid catching the housing of the handset on some projecting part, such as the spring arms of the patent. Moreover, such spring means, requiring elements or arms of substantial resilience, are not of entirely suitable form and design to support the weight and downward pull which are exerted in the operations of removal and replacement and for support of the handset.

It is an object of the invention to provide a bracket or hanger for supporting a handset of the type above described which will avoid the objections experienced in the devices of the prior art.

It is another object of the invention to provide a bracket on which the handset may be supported and with respect to which the essential movement of the handset, particularly of its housing to be engaged with or removed from the bracket, is accomplished without requiring an initial upward movement and a subsequent downward movement of the instrument.

It is a further object of the invention to provide a telephone handset bracket in which the means for biasing the housing into engagement with the seat of the bracket is disposed so as not to be engaged by the hand which holds the instrument.

It is a still further object of the invention to provide a bracket having means for supporting the weight of the instrument which is of such limited extent projecting from the bracket and its seat as not to be engaged by the hand while providing for fully supporting the instrument.

It is an additional object of the invention to provide a bracket for a telephone handset in which means provided for biasing the housing in engagement with the seat is not required to support the weight of the instrument.

It is a feature of the invention that the bracket comprises a member providing a seat extending generally upwardly and downwardly and adapted to be engaged by the operating face of the housing from which the handle of the handset extends, the housing being rigidly connected to this handle. Spring means is provided which cooperates with the member and its seat and with an abutment carried by the bracket in such a manner that the operating face of the housing is maintained in engagement with the seat of the member, the handset being supported by the abutment. As will be more clearly understood from a consideration of the description to follow taken in connection with the drawings, the spring means utilized is supported in relation to the member which provides the seat in such a manner that an element of the spring means extends from the member transversely of the seat outwardly and over the convex surface of the housing of the handset when this housing in the supported position of the handset is disposed between the spring means and the seat with the operating face adjacent the seat. The element of the spring means is of such form as to be adapted to engage the convex surface of the housing rearwardly with respect to the operating face of the housing and so as to bias the housing to the position with the operating face in engagement with the seat. The spring means may be supported by the member adjacent or at the upper end of the member which provides the seat and the form and position of the spring element thereof may be such that this element extends from this point of support outwardly and over the convex surface of the housing. The outer end of the element, or preferably two points on the element disposed outwardly from the seat, may engage the convex surface of the housing at a portion or portions thereof disposed rearwardly of the operating face such that the pressure of the spring means at these points forces the housing against the seat.

In the bracket of the invention the abutment is disposed adjacent the lower end or portion of the seat. The form of this abutment is such that the peripheral portion of the housing that is adjacent the operating face thereof engages the abutment when the operating face is disposed adjacent or against the seat provided on the member of the bracket. The abutment in this position with respect to the seat also may provide a point of reaction against a component of the force transmitted through the housing from the spring means as the spring means presses the housing toward the seat and toward the abutment. Moreover, this abutment serves to support the weight of the handset, so that the spring means and the element thereof which engages the convex surface of the housing may be relieved of all of the force due to the weight of the handset, although in some cases the spring means may be formed and disposed so as to apply some upwardly directed pressure upon the housing while still disposed upwardly with respect to the seat.

It will be understood from the above description and that to follow in connection with the drawings that, by a simple continuous upwardly directed movement of the handset held with the housing thereof which is to be brought into engagement with the bracket disposed upwardly with respect to the handle, this housing may be moved into engagement with the under side of the upwardly disposed spring means without bringing the fingers of the hand into engagement with the spring means. By virtue of the construction of the handset the fingers and adjacent parts of the hand of the user are separated from the spring means in the device of the invention by a large portion of the housing and so are prevented from such engagement and possible injury. The abutment disposed at the lower side of the seat need only project outwardly from the seat of the member of the bracket sufficiently to provide a shelf or step adequate to support the weight of the handset and to provide the reaction to the component of the pressure of the spring means which in some cases may be exerted against this abutment. This abutment preferably is made of a material sufficiently hard and strong for this purpose while also providing a smooth outwardly disposed surface which may be inclined somewhat with respect to the seat surface so as better to guide the housing to the position in which it is held by the spring means and the supporting abutment.

These and other objects and features of the invention will be understood from the description to follow of the drawings in which.

Figure 2:
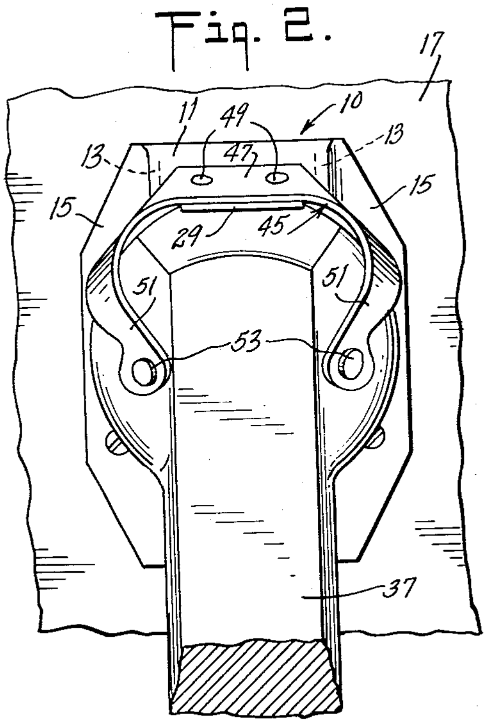
FIG. 2 is an elevation viewed from the right in FIG. 1.
Figure 3:
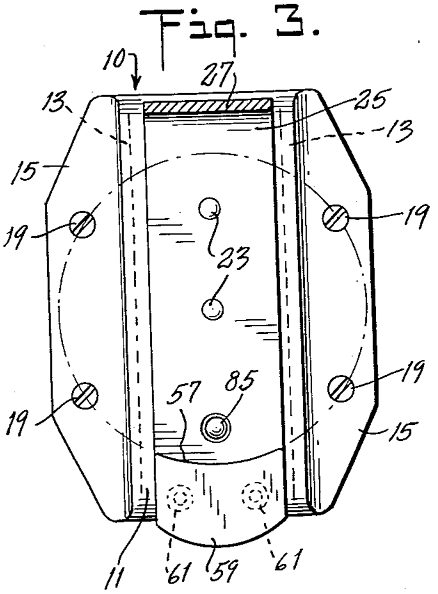
FIG. 3 is a section on line 3—3 of FIG. 1.

The bracket 10, as shown in the drawings, comprises a body or base 11 which may be of cast metal or otherwise fabricated to provide walls 13 extending about a hollow space within the base and provided, as shown in FIGS. 2 and 3, with external flanges 15 extending laterally from the vertical walls 13. The flange 15 may be disposed in face to face relation to a vertical support 17 and held thereto by screws 19 passing through the flanges. The base 11 between the vertical walls 13 may be open at the face thereof disposed toward the support 17 for access to the hollow space. This hollow space is closed by wall 21 of the base 11 that is disposed outwardly with respect to flanges 15, the wall 21 being somewhat inclined relative to the vertical.

Figure 1:
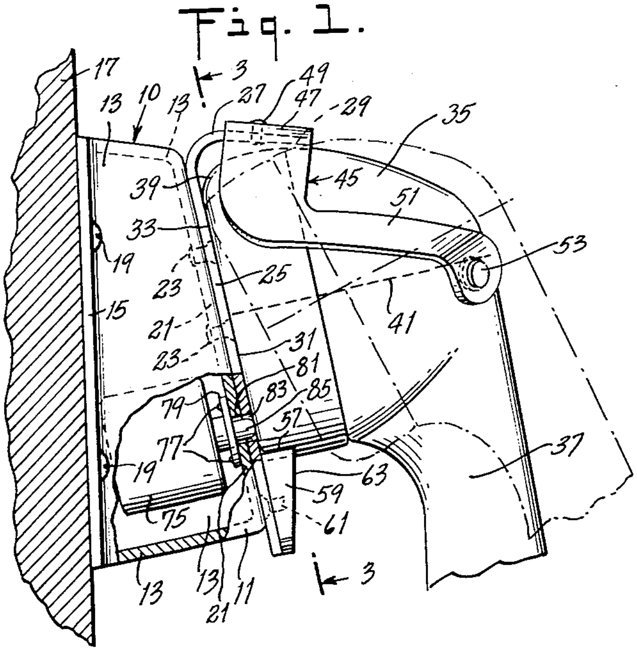
FIG. 1 shows a side elevation of the bracket of the invention supporting an instrument housing of a handest, a part of the base of the bracket being broken away.

Secured to the outer face of the wall 21 by rivets 23 is a member 25 which may be formed of a metal strip having a substantial width and thickness as shown in FIGS. 1 and 3, and bent over at its upper portion 27 to provide a substantially rigid outwardly projecting portion 29. The member 25 provides an outwardly disposed surface 31 which serves as a seat against which bear peripheral portions of the operating face 33 of a housing 35 which is carried at one end of the handle 37 of the handset. Ordinarily the housing 35 is the housing for the receiver instrument of the telephone, the operating face 33 being adapted to be held against the ear of the user. This operating face conventionally is provided with a disc or wall extending across the space about which the peripheral portion 39 of the housing extends. Conventionally also, the disc is provided with perforations therethrough for passage of the sound waves. The operating face 33 of the housing 35 ordinarily is formed so that its peripheral surface is disposed in a plane forwardly of the perforated part, so that the face 33 may be brought into bearing engagement with the surface or seat 31 of the member 25, as shown in FIG. 1. This surface 31 may be of such vertical and lateral extent as to engage the whole periphery of the housing but, as shown in FIG. 3, it may be of such width as to engage only the upper and lower parts of this periphery.

The housing 35 may be of the usual conventional bulbous form, although within the scope of the invention other types of housing may be accommodated in the supporting bracket of the invention. Usually, as shown in FIG. 1, the housing 35 has a convex exterior surface disposed rearwardly with respect to the operating face 33 of the housing. The telephone instrument, such as the receiver, not shown in the drawing, may be disposed within the housing 35. In the position of the handset shown in full lines in FIG. 1 the convex surface of the housing 35 has a center line 41 which may be normal to the operating face of the housing. Means about to be described are provided for holding the housing 35 with its operating face 33 against the seat 31.

As shown in FIG. 1, a spring means 45 is carried by the projecting portion 29 of the member 25 and is disposed at the upper side of the housing. The spring means has a base portion 47 riveted by rivets 49 to the projecting portion 29 of the member 25. From the base portion 47 spring elements or arms 51 extend in suitable contour outwardly with respect to the seat 31 and over the convex surface of the housing 35. In the embodiment of FIG. 1 the arms 51 reach out to two points at either side of the vertical plane, as shown also in FIG. 2, to engage portions of the surface of the housing 35 that are somewhat below the center line 41. It will be understood from a consideration of FIGS. 1 and 2 that the spring elements 51 may be deflected slightly both laterally in FIG. 2 and upwardly in FIG. 1 as the housing 35 is drawn from beneath the arms 51 and away from the position in which its operating face 33 engages the seat 31. In such movement the housing and the handset may move to a position such as that shown in dot and dash line in FIG. 1 and from this dot and dash position the handset may be drawn downwardly with concomitant movement of the arms 51 to their unstressed positions. In the position shown in full lines in FIG. 1, however, the spring elements 51 at the outer ends thereof, preferably through the bearing of suitable buttons 53 carried thereby which may be of plastic or other material providing low friction, because of their resilience press on the housing 35 at points below the line 41 and serve to move the housing toward the bracket and to hold the operating face 33 of the housing against the seat 31.

In the full line position, as shown in FIG. 1, the peripheral portion 39 of the housing rests on the upper step surface 57 of an abutment 59 which, by means of screws 61 inserted through the member 25 from the back thereof, is secured to the outer face of the member 25 at its lower end, the screws 61 being threaded into the material of the abutment 59 which, for example, may be made of nylon. This abutment in the embodiment disclosed in the drawing is of tapered form with the wider part of the abutment being disposed upwardly to provide the step surface 57 while also disposing the outer surface 63 of the abutment generally vertically. As the handset is brought toward engagement with the bracket, the surface of the peripheral portion 39 of the housing may engage and slide upwardly upon the outer surface 63 until, as the housing is moved upwardly, it is brought into engagement with the buttons 53 of the spring means 45. This upward movement of the handset effected by upward movement of the hand gripping the handle 37 may be continued until the upper part of the housing is well beneath the spring elements 51 and, by slight angular movement clockwise in FIG. 1, the lower part of the peripheral surface 39 of the housing may be set upon the upper step surface 57 of the abutment 59.

When the operating face 33 is in engagement with the seat 31 and is held in such engagement by the spring action of the elements 51 as described, the weight of the housing and of the handset as a whole is brought mostly upon the abutment 57, although some of the weight may come upon the inclined seat surface of the member 25. The handset thus is firmly supported on the bracket. For more securely supporting the housing in this manner, the upper surface 57 of the abutment is made arcuate to conform generally to the contour of the peripheral portion 39 of the housing 35, as may be seen in FIG. 3 in which the dot and dash circle represents the periphery of the housing.

Figure 4:
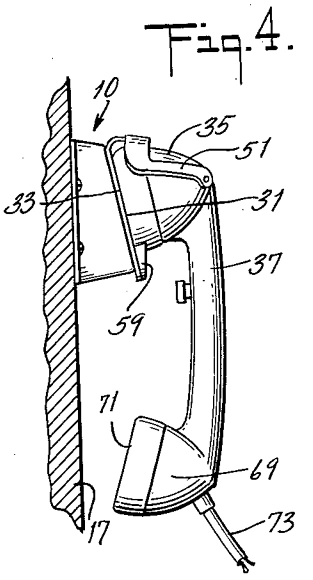
FIG. 4 is a side elevation to reduced scale showing a complete handset supported in the bracket.

As shown in FIG. 4, a handset of conventional type which comprises a housing 35 containing the receiving instrument to be held against the ear of the user and rigidly connected at the upper end of the handle 37 also is provided with a transmitting instrument contained in the housing 69 connected to the handle at its lower end. The operating face 33 of the receiver housing is disposed in conventional angular relation to the operating face 71 of the transmitter housing 69. As is usual, the electric leads 73 are brought into the lower housing 69. The bracket 10 of the invention provides for supporting such a handset by engagement of its upper housing 35 in the manner above described with the spring elements 51 and the abutment 59. Because of the form of the body or base 11 and the abutment 59, the center of gravity of the instrument thus disposed may be adjacent the vertical through the abutment 59, so that the weight of the handset is brought primarily on the abutment. The spring elements 51, therefore, principally serve to hold the operating face 33 against the seat 31.

Only slight upward movement of the handset gripped by the hand of the user and producing upward pressure of the housing 35 on the spring elements 51 is required to release the peripheral portion 39 of the housing from its bearing engagement with the step surface 57 of the abutment. Then, upon slight tilting of the handset to the dot and dash position of FIG. 1, the housing is released for movement downwardly away from the bracket. These movements may be made while the hand of the user firmly grips the handle 37. In replacing the handset on the bracket also the housing 35 may be moved upwardly into engagement with the abutment 59 and with the spring elements 51, only slight upward movement of the elements 51 being required to provide for tilting movement of the housing from the dot and dash position of FIG. 1 to the full line position to bring the face 33 into engagement with the seat 31 and the peripheral portion 39 of the housing into position resting on the step surface 57 of the abutment. In these movements of removal of the handset from the bracket and of replacing it thereon movement of the housing above the spring elements is not required and the hand of the user is not brought to a position adjacent any projecting part, particularly the spring elements which extend a substantial distance outwardly from the bracket, so as to be engaged thereby.

The space defined within the walls 13 and 21 of the bracket body or base 11 provides for disposition therein of a switch 75 supported by fasteners 77 extending through a flange 79 and engaging the wall 21 of the bracket base. Openings 81 and 83 are provided respectively in the wall 21 and in the member 25 through which a switch element 85 extends which may be biased toward the right in FIG. 1 by means not shown. When the handset is moved from the bracket the element 85 will project through the member 25 and, upon placing the handset in position on the bracket, the operating face 33 or of a suitable part of the forward portion of the housing may be brought into engagement with the element 85 to effect movement thereof toward the left against its bias. The switch 75 may be of conventional construction so that these movements of the element 85 will effect the desired switching operation. The pressure on the spring elements 51 and, having regard to the inclination of the seat 31, a small component of the weight of the handset together are effective to actuate the element 85 toward the left, this pressure being relieved when the handset is removed from the bracket so that the element 85 may move to the right.

Variations may be made in the form of and in the material of the different parts of the device to suit different conditions and to provide for holding handsets having housings of different contours. The bracket body or base 11 and the member 25 may be made of different forms and of different materials while providing the functions which have been described. The body or base 11 may be made as a die casting of aluminum alloy or other moldable material. The member 25 preferably is made of stainless steel to resist corrosion. Preferably, the spring means 45 and particularly its spring elements 51 are of metal, such as steel, which has the requisite resilience to provide the spring action. These steel parts may be chromium plated. Other variations may be made by those skilled in the art while providing in the device of the invention the features which have been described. All such variations are intended to come within the scope of the appended claims.

I claim:

1. A bracket for supporting a telephone handset which has an instrument housing and a handle rigidly connected to and extending from said housing, said bracket being adapted to support said housing so as removably to hold said handset in position with the handle extending generally downwardly from said housing, said housing being defined by an operating front face and an exterior surface of convex contour disposed rearwardly with respect to said face, said bracket comprising a member providing a seat extending generally upwardly and downwardly and adapted to be engaged by said face of said housing, spring means supported by said member and having an element extending from said member transversely of said seat outwardly and over said convex surface of said housing when said housing is disposed between said spring means and said seat with said operating face adjacent said seat, said element having a form adapted to engage said convex surface of said housing rearwardly with respect to said face and so as to bias said housing to a position with said face in engagement with said seat, the space below said element and between said element and said seat being open downwardly and substantially unobstructed to provide for movement of said housing upwardly into said space, and an abutment supported by said member in downwardly spaced relation to said spring means and so as to be engaged by a peripheral portion of said housing that is adjacent said operating face thereof and at the opposite side of said housing from said surface thereof engaged by said element of said spring means as said housing is moved upwardly into said space so that the pressure of said spring means upon said convex surface of said housing is effective to hold said housing against said seat and so as to be supported by said abutment.

2. A bracket for supporting a telephone handset which has an instrument housing and a handle, rigidly connected to and extending from said housing, said bracket being adapted to support said housing so as removably to hold said handset in position with said handle extending generally downwardly from said housing, said housing being defined by an operating front face and an exterior surface of convex contour disposed rearwardly with respect to said face, said bracket comprising a member providing a seat extending generally upwardly and downwardly and adapted to be engaged by said face of said housing, spring means supported by said member and having an element extending from said member transversely of said seat outwardly and over the upper part of said convex surface of said housing when said housing is disposed between said spring means and said seat with said operating face adjacent said seat, said element having a form providing at two points spaced transversely of said extent of said element for engaging respective parts of said convex surface of said housing rearwardly with respect to said face so as to bias said housing to a position with said face in engagement with said seat, the space below said element and between said element and said seat being open downwardly and substantially unobstructed to provide for movement of said housing upwardly into said space, and an abutment supported by said member in downwardly spaced relation to said two points of said element and so as to be engaged as said housing is moved upwardly into said space by a peripheral portion of said housing that is adjacent said operating face thereof and at the opposite side of said housing from said two parts of said surface thereof engaged by said element of said spring means, said abutment providing a bearing surface disposed in such relation to said two points of said element that the pressure of said spring means upon said convex surface of said housing is effective to hold said face of said housing against said seat with said peripheral portion of said housing against said bearing surface of said abutment.

3. A bracket for removably holding a telephone handset as defined in claim 1 in which said abutment is provided with an exposed smoothly contoured surface for initial sliding engagement therewith of said peripheral portion of said housing that is adjacent said operating front face thereof for guiding said housing in said upward movement as it is being inserted between said spring means and said abutment to said position with said front face of said housing against said seat of said member and with said peripheral portion of said housing engaging said abutment for supporting said handset.

4. A bracket for removably holding a telephone handset as defined in claim 3 in which said abutment provides a step surface transverse to said seat for engaging said peripheral portion of said housing adjacent said face thereof for supporting said housing on said step surface.

5. A bracket for supporting a telephone handset as defined in claim 1, said front face of said housing being inclined toward said handle in the direction from said housing along said handle, said seat on said member being disposed generally in a plane inclined with respect to the vertical outwardly from said member and downwardly relative to said spring means and so that said front face of said housing at least for a substantial portion of the periphery thereof is in bearing relation to said seat when said handset is disposed with said handle extending generally vertically downward from said housing.

6. A bracket for supporting a telephone handset as defined in claim 5 which comprises an element adapted to actuate a switch and supported by a part of said bracket so as to project through said seat and for movement of said switch actuating element transversely of said seat, said switch actuating element being disposed so as to be engaged by said housing and moved thereby to position in which said switch is actuated as said housing is moved toward said seat and held in switch actuating position when said housing is held against said seat and supported by said abutment.

References Cited in the file of this patent

UNITED STATES PATENTS

| | | |
|---|---|---|
| 1,801,098 | Marsik | Apr. 14, 1931 |
| 2,443,329 | Sears | June 15, 1948 |
| 2,467,383 | Huff | Apr. 19, 1949 |